(12) United States Patent
Tanaka et al.

(10) Patent No.: US 6,466,705 B2
(45) Date of Patent: Oct. 15, 2002

(54) ACOUSTO-OPTIC VARIABLE-WAVELENGTH TE/TM MODE CONVERTER, AND A VARIABLE-WAVELENGTH OPTICAL FILTER USING THIS CONVERTER

(75) Inventors: Takehito Tanaka, Kawasaki (JP); Yoshinobu Kubota, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 33 days.

(21) Appl. No.: 09/748,180

(22) Filed: Dec. 27, 2000

(65) Prior Publication Data

US 2001/0012421 A1 Aug. 9, 2001

(30) Foreign Application Priority Data

Jan. 25, 2000 (JP) ........................................ 2000-016250

(51) Int. Cl.[7] .............................. G02F 1/335; G02F 1/11
(52) U.S. Cl. .............................. 385/11; 385/7; 359/285; 359/308
(58) Field of Search ................ 385/7, 11; 359/285–287, 359/305, 308

(56) References Cited

U.S. PATENT DOCUMENTS

| | | | |
|---|---|---|---|
| 5,218,653 A | 6/1993 | Johnson et al. | |
| 5,400,171 A | 3/1995 | Song | |
| 5,446,807 A | 8/1995 | Baran et al. | |
| 5,455,877 A | 10/1995 | Baran et al. | |
| 5,652,809 A | 7/1997 | Aronson | |
| 5,677,971 A | 10/1997 | Okayama et al. | |
| 5,781,669 A | * 7/1998 | Schmid et al. | ................ 385/10 |
| 5,850,492 A | 12/1998 | Morasca et al. | |

FOREIGN PATENT DOCUMENTS

| | | | | |
|---|---|---|---|---|
| JP | A 05 333298 | 12/1993 | ............. | G02F/1/11 |
| JP | A 08 211349 | 8/1996 | ............. | G02F/1/11 |
| JP | A 08 234150 | 9/1996 | ............. | G02F/1/11 |
| JP | A 08 286160 | 11/1996 | ............. | G02F/1/11 |
| JP | A 11 064809 | 3/1999 | ........... | G02F/1/125 |

OTHER PUBLICATIONS

Smith, David A., et al., "Surface–Acoustic–Wave Directional Coupler for Apodization of Intregrated Acousto–Optic Filters," IEEE Transactions on Ultrasonics, Ferroelectrics, and Frequency Control. vol. 40, No. 1, Jan. 1993, pp. 22–25.

Jackel, Janet L., et al.,"Multichannel Operation of AOTF Switches: Reducing Channel–to–Channel Interaction," IEEE Photonics Technology Letters, vol. 7, No. 4, Apr. 1995, pp. 370–372.

* cited by examiner

Primary Examiner—Hemang Sanghavi
Assistant Examiner—Omar Rojas, Jr.
(74) Attorney, Agent, or Firm—Staas & Halsey

(57) ABSTRACT

An acousto-optic variable-wavelength TE/TM mode converter is configured by comprising an optical waveguide, a coupled acoustic waveguide composed of two acoustic waveguides, comb electrodes arranged at the acoustic waveguides, and surface acoustic wave absorbers arranged at the acoustic waveguide. If high-frequency electric signals having different frequencies are applied to the electrodes, surface acoustic waves $W_{11}$ and $W_{12}$ occur on the surface of the piezoelectric substrate, meander and propagate in the substrate, and are finally absorbed by the absorbers. The intensity distributions of the surface acoustic waves $W_{11}$ and $W_{12}$ are distributions where the intensity is high in a middle portion of the optical guide, and low at both ends of the optical waveguide. The peak positions of the intensities are different, and the bases of the distributions partially overlap between the two absorbers.

18 Claims, 5 Drawing Sheets

ACOUSTO-OPTIC VARIABLE-WAVELENGTH TE/TM MODE CONVERTER, AND A VARIABLE-WAVELENGTH OPTICAL FILTER USING THIS CONVERTER

BACKGROUND OF THE INVENTION

1. Field of the Invention

The present invention relates to an acousto-optic variable-wavelength TE/TM mode converter, and a variable-wavelength optical filter using this converter.

A TE/TM mode converter of this kind can convert TE mode light into TM mode light or vice versa by using an acousto-optic interaction. Accordingly, this converter is available for various types of optical devices or optical systems. For example, a variable-wavelength optical filter can be configured by combining this TE/TM mode converter and polarizers. Such a variable-wavelength optical filter is available, for example, as a variable-wavelength optical filter for use in a variable-wavelength coupler/splitter, etc. in a wavelength division multiplexing (WDM) optical communications system.

2. Description of the Related Art

An acousto-optic TE/TM mode converter is conventionally known. This converter is normally composed of an area where a surface acoustic wave (SAW) is excited and propagated, and an optical waveguide that is arranged to acousto-optically interact with the surface acoustic wave, which are arranged in a piezoelectric substrate.

The surface acoustic wave is excited by applying a high-frequency (RF) electric signal to a comb electrode arranged in a substrate, and propagated while being guided by a coupled acoustic waveguide arranged on the substrate. By arranging an optical waveguide in the propagation area of the surface acoustic wave, light and the surface acoustic wave are made to interact with each other. Consequently, only the light having the wavelength that phase-matches the wavelength of the surface acoustic wave is selectively TE/TM-mode-converted. The wavelength of the surface acoustic wave is changed by varying the frequency of the high-frequency signal applied to the comb electrode, so that the wavelength of TE/TM-mode-converted light can be selected. As references for such a TE/TM mode converter, for example, "Optical Integrated Circuit"(written by H. Nishihara (et al.), published by Ohmsha), "Fundamentals of Optical Electronics" written by A. Yariv, published by Maruzen Co, Ltd., etc. can be cited. For further details, please see these references.

The above described TE/TM mode converter is applicable to various optical devices with its mode conversion capability. For example, a variable-wavelength optical filter can be formed by respectively arranging polarizers in an input portion and an output portion of the optical waveguide in the above described TE/TM mode converter. In this case, the variable-wavelength optical filter can be configured as a bandpass filter or a bandstop filter (rejection filter) by changing the arrangement, etc. of the two polarizers. Thus configured variable-wavelength optical filter can simultaneously filter multiple wavelengths by applying a plurality of high-frequency electric signals to comb electrodes in a TE/TM mode converter. Namely, the lights having the wavelengths that correspond to the frequencies of the applied high-frequency electric signals can be filtered at the same time.

However, a side lobe, which is undesirable as an optical filter characteristic, occurs in such type of a variable-wavelength optical filter. As a result, a wavelength other than a selected wavelength is filtered, or the flatness of the filtering characteristic is deteriorated.

To overcome the above described problems, for example, the technique with which the intensity distribution of a surface acoustic wave is given in the longitudinal direction of an optical waveguide, which is disclosed by U.S. Pat. No. 5,400,171, is adopted. With this technique, however, a selected wavelength gets out of position or the depth of rejection is deteriorated if high-frequency electric signals having adjacent frequencies are simultaneously applied to the same acousto-optic interaction area. Accordingly, lights having multiple adjacent wavelengths cannot selectively be filtered, leading to a difficulty in use of such an optical filter for a variable-length coupler/splitter in a WDM optical communications system.

In the meantime, for example, the technique with which an interaction area in a TE/TM mode converter is separated into two areas, and high-frequency electric signals having adjacent frequencies are distributed into the respective areas may be also considered as disclosed by U.S. Pat. No. 5,455,877. The top view of the configuration of the TE/TM mode converter adopting such a technique is shown in FIG. 1A.

The TE/TM mode converter shown in this figure comprises: an optical waveguide 1; a coupled acoustic waveguide 2 composed of adjacent first and second acoustic waveguides 2a and 2b; first and second comb electrodes 3 and 4 respectively arranged at both ends of the coupled acoustic waveguide 2; and a surface acoustic wave absorber 5 arranged to go across the center of the coupled acoustic waveguide 2. The coupled acoustic waveguide 2 is partitioned off by three areas 7a, 7b, and 7c, which are titanium (Ti)-diffused in a piezoelectric substrate. The central Ti-diffused area 7b is a gap (a gap between acoustic waveguides) that separates the two acoustic waveguides 2a and 2b. The comb electrodes 3 and 4 are arranged within the first acoustic waveguide 2a, whereas the optical waveguide 1 is arranged within the second acoustic waveguide 2b.

In the TE/TM mode converter having such a configuration, if high-frequency electric signals having adjacent frequencies are respectively applied to the comb electrodes 3 and 4, surface acoustic waves $W_1$ and $W_2$, which correspond to the respective frequencies, occur on the surface of the piezoelectric substrate. These surface acoustic waves $W_1$ and $W_2$ propagate on the surface of the board while being guided by the coupled acoustic waveguide 2, and is finally absorbed by the absorber 5. Each of the surface acoustic waves $W_1$ and $W_2$ acousto-optically interacts with the light propagating through the optical waveguide 1 during this propagation. Only the lights having the wavelengths that respectively correspond to the frequencies of the above described high-frequency electric signals are selectively TE/TM-mode-converted and output from the output portion of the optical waveguide 1. In this case, the intensity distribution of the surface acoustic waves $W_1$ and $W_2$ in the longitudinal direction of the acoustic waveguide 2 are those shown in FIG. 1B. Substantially, the area where the surface acoustic waves $W_1$ and $W_2$ interact with light are separated into two.

Accordingly, if an optical filter is configured by using the TE/TM mode converter having such a configuration, the above described problems that the selected wavelength gets out of position, and the depth of rejection is deteriorated are overcome, whereby lights having adjacent wavelengths can selectively be filtered at the same time.

However, with the TE/TM mode converter having the configuration shown in FIG. 1A, the area where the surface acoustic waves $W_1$ and $W_2$ interact with light are completely separated into two in the longitudinal direction of the acoustic waveguide 2. Therefore, the interaction length for each interaction area is shortened, and a sufficient interaction is difficult to be obtained as it is. Therefore, the power of a high-frequency signal must inevitably be intensified to secure a sufficient interaction, and at the same time, a side lobe characteristic is deteriorated.

SUMMARY OF THE INVENTION

An object of the present invention is to provide an acousto-optic variable-wavelength TE/TM mode converter which can selectively mode-convert lights having multiple adjacent waves at the same time while preventing the power of a high-frequency signal from increasing so as to overcome the conventional problems described earlier.

Another object of the present invention is to provide a variable-wavelength optical filter which can selectively filter lights having multiple adjacent wavelengths at the same time while preventing the power of a high-frequency electric signal from increasing.

The present invention is configured as follows to achieve the above described objects.

An acousto-optic variable-wavelength TE/TM mode converter according to the present invention comprises: an optical waveguide arranged in a piezoelectric substrate; a plurality of comb electrodes generating surface acoustic waves in the piezoelectric substrate; a coupled acoustic waveguide guiding the surface acoustic waves propagating in the piezoelectric substrate; and surface acoustic wave absorbers absorbing the surface acoustic waves. A gap between acoustic waveguides, which is arranged between the two acoustic waveguides configuring the above described coupled acoustic waveguide, is comprised at least in a partial area. The above described optical waveguide is arranged in one of the two acoustic waveguides separated by the gap between the acoustic waveguides, whereas the two comb electrodes are arranged in the other of the acoustic waveguides. Additionally, the respective surface acoustic wave absorbers are arranged at the positions which are interposed between the two comb electrodes, and are different in correspondence with the respective two comb electrodes.

With such a configuration, respective surface acoustic absorbers are arranged at the positions which are interposed between two comb electrodes, and are different in correspondence with the respective two comb electrodes. As a result, an interaction area exists for each surface acoustic wave, and the locations of these two interaction areas do not match. Therefore, even if a plurality of high-frequency electric signals having adjacent frequencies are applied to the comb electrodes, the problems that a selected wavelength gets out of position, and the depth of rejection is deteriorated do not arise.

Besides, unlike the configuration shown in FIG. 1A, in which a single surface acoustic wave absorber is arranged to completely separate the interaction area into two, respective surface acoustic wave absorbers are arranged at different positions corresponding to two comb electrodes. Therefore, an interaction area is not completely separated into two. As a result, the interaction length of each interaction area can sufficiently be secured, thereby eliminating the need for applying high-frequency electric signals having high power to the comb electrodes, and also preventing a side lobe characteristic from being deteriorated.

It is desirable to configure the TE/TM mode converter as follows, if the above described two comb electrodes are respectively defined to be first and second comb electrodes, the above described surface acoustic wave absorbers, which respectively correspond to the first and second comb electrodes, are defined to be first and second surface acoustic wave absorbers. Namely, the TE/TM mode converter desirably has a configuration such that: the first comb electrode, the second surface acoustic wave absorber, the first surface acoustic wave absorber, and the second comb electrode are arranged in this order in the other of the acoustic waveguides stated earlier; a first surface acoustic wave generated by the first comb electrode is absorbed by the first surface acoustic wave absorber, whereas a second surface acoustic wave generated by the second comb electrode is absorbed by the second surface acoustic wave absorber; and the first and second surface acoustic waves respectively have intensity distributions where an intensity is high in a middle portion of the optical waveguide, and low at both ends of the optical waveguide, and the peak positions of the intensity distributions are different.

Additionally, if the TE/TM mode converter according to the present invention is used in a WDM optical communications system, etc., it is desirable to respectively assign high-frequency electric signals having adjacent frequencies to the above described two comb electrodes. In this way, the frequency interval of high-frequency electric signals applied to the same comb electrode can be widened, so that a more satisfactory wavelength selection characteristic can be expected.

A variable-wavelength optical filter according to the present invention is configured by comprising: an acousto-optic variable-wavelength TE/TM mode converter configured as described above according to the present invention; and first and second polarizers respectively arranged at the input and output portions of the acousto-optic variable-wavelength TE/TM mode converter.

By using the acousto-optic variable-wavelength TE/TM mode converter according to the present invention as described above, a variable-wavelength optical filter which can selectively filter lights having multiple adjacent wavelengths at the same time while preventing the power of high-frequency electric signals from increasing.

Here, if the first and second polarizers are arranged to make their axes parallel, a bandstop filter is configured. Or, if the first and second polarizers are arranged to make their axes orthogonal, a bandpass filter is configured.

In the TE/TM mode converter according to the present invention, as long as respective surface acoustic waves, which are generated by a plurality of comb electrodes and propagate in a piezoelectric substrate, have the following intensity distribution regardless of the arrangement of an optical waveguide, acoustic waveguides, comb electrodes, surface acoustic wave absorbers, etc., a similar action can be expected. That is, the intensity distributions of respective surface acoustic waves may be distributions where an intensity is high in a middle portion of the optical waveguide, and low at both ends of the optical guide, and the peak positions of the intensities are different, and the distributions partially overlap in an area where the intensities are low.

DESCRIPTION OF THE DRAWINGS

The foregoing and other objects, features and advantages will be apparent from the following more particular description of preferred embodiments of the invention as illustrated in the accompanying drawings.

DESCRIPTION OF THE PREFERRED EMBODIMENTS

Figures 1A, 1B:
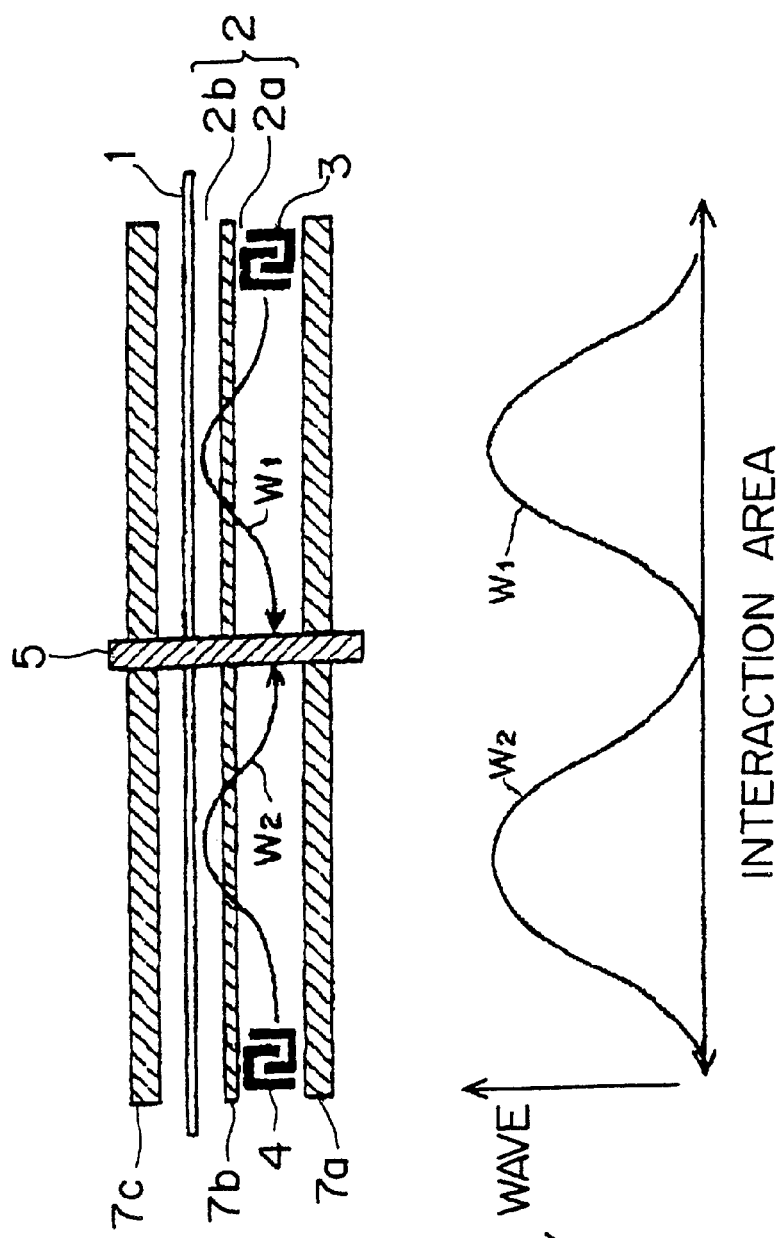
FIG. 1A exemplifies a top view of a conventional TE/TM mode converter.
FIG. 1B shows an intensity distribution of surface acoustic waves of the TE/TM mode converter.

Hereinafter, preferred embodiments according to the present invention will be described by referring to the drawings.

First of all, a TE/TM mode converter 10 shown in FIG. 2A will be explained.

This TE/TM mode converter 10 comprises: a single optical waveguide 11 formed by being Ti-diffused in a piezoelectric substrate configured, for example, by x-cut $LiNbO_3$ crystals, etc.; a coupled acoustic waveguide 12 composed of adjacent first and second acoustic waveguides 12a and 12b; first and second comb electrodes 13 and 14 respectively arranged at both ends of the first acoustic waveguide 12a; and first and second surface acoustic wave absorbers 15 and 16 arranged to go across the two points on the course of the first acoustic waveguide 12a. The coupled acoustic waveguide 12 is partitioned off by three areas 17a, 17b, and 17C which are titanium(Ti-)diffused in the piezoelectric substrate. The central Ti-diffused area 17b is a gap (gap between acoustic waveguides) separating the two acoustic waveguides 12a and 12b. The comb electrodes 13 and 14 are arranged within the first acoustic waveguide 12a, whereas the optical waveguide 11 is arranged within the second acoustic waveguide 12b.

Here, the coupled acoustic waveguide 12 configured by the two separated acoustic waveguides 12a and 12b is formed to have a coupled length Lc. The first surface acoustic wave absorber 15 is arranged at the position having the coupled length Lc from the first comb electrode 13 toward the opposite end, whereas the second surface acoustic wave absorber 16 is arranged at the position having the coupled length Lc from the second comb electrode 14 toward the opposite end. In this case, the portions where the area of the second acoustic waveguide 12b and the optical waveguide 11 overlap are areas where an acousto-optic interaction occurs (interaction areas). Note that the relationship between the coupled length Lc and the distance L between the two comb electrodes 13 and 14 is normally Lc<L<2Lc. In the example shown in FIG. 2A, the interval between the two surface acoustic wave absorbers 15 and 16 is Lc/2, and the interval between the two comb electrodes 13 and 14 is 3Lc/2.

If high-frequency electric signals having different frequencies are applied to the comb electrodes 13 and 14 in the TE/TM mode converter 10 having the above described configuration, first and second surface acoustic waves $W_{11}$ and $W_{12}$, which respectively correspond to the frequencies, occur on the surface of the piezoelectric substrate. The surface acoustic waves $W_{11}$ and $W_{12}$ meander and propagate while being guided by the coupled acoustic waveguide 12, and are finally absorbed by the corresponding absorbers 15 and 16.

Figure 2A:
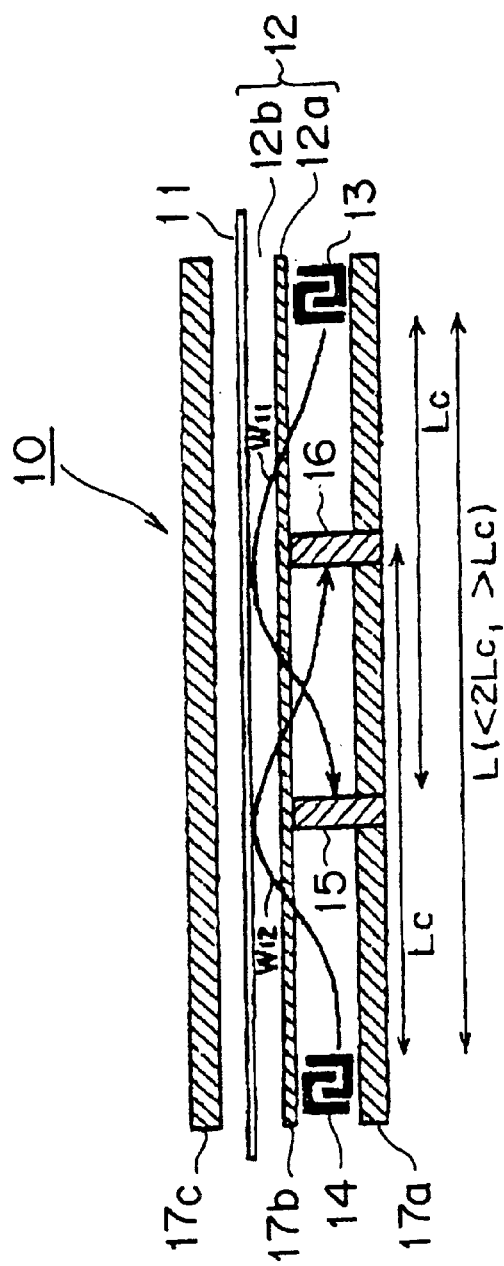
FIG. 2A shows the top view of a TE/TM mode converter according to one preferred embodiment of the present invention.
Figure 2B:
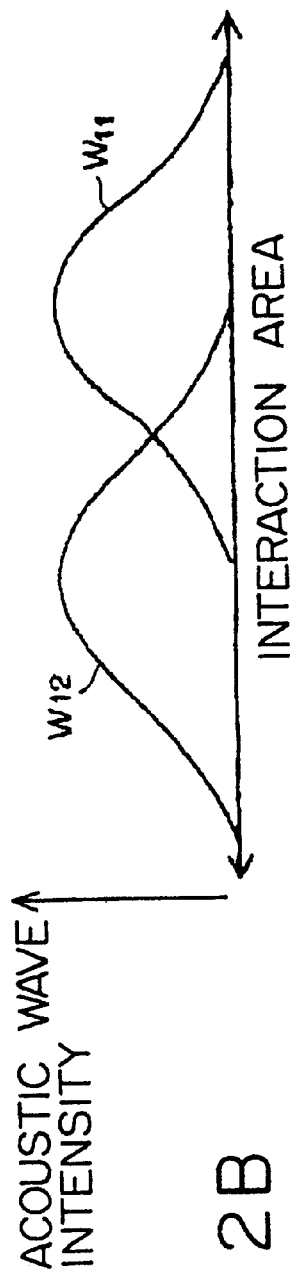
FIG. 2B shows the intensity distributions of surface acoustic waves of the TE/TM mode converter shown in FIG. 2A.

Namely, the intensity of the first surface acoustic wave $W_{11}$ excited by the first comb electrode 13 within the first acoustic waveguide 12a transfers to the second acoustic waveguide 12b at the point where the first surface acoustic wave $W_{11}$ proceeds to the left almost by Lc/2 in FIG. 2A, returns to the first acoustic waveguide 12a after proceeding further by Lc/2, and disappears by being absorbed by the first absorber 15. In the meantime, the intensity of the second surface acoustic wave $W_{12}$ excited by the second comb electrode 14 transfers to the second acoustic waveguide 12b at the point where the second surface acoustic wave $W_{12}$ proceeds to the right almost by Lc/2 in FIG. 2A, returns to the first acoustic waveguide 12a after proceeding further by Lc/2, and disappears by being absorbed by the second absorber 16. In this case, as shown in FIG. 2B, the intensity distributions of the surface acoustic waves $W_{11}$ and $W_{12}$ in the longitudinal direction of the acoustic waveguide 12 are distributions where an intensity is high in a middle portion of the optical waveguide 11, and low at both ends of the optical waveguide 11, the peak positions of their intensities are different, and the bases of the distributions partially overlap between the absorbers 15 and 16.

Accordingly, light propagating through the optical waveguide 11 acousto-optically interacts with the respective two surface acoustic waves $W_{11}$ and $W_{12}$ in the substantially separated areas. Therefore, even if high-frequency electric signals having adjacent frequencies are applied to the comb electrodes 13 and 14, the problems that a selected wavelength gets out of position, and the depth of rejection is deteriorated as described above do not occur. As a result, only the lights having the wavelengths that respectively correspond to the adjacent frequencies can selectively be mode-converted and output.

Besides, unlike the configuration shown in FIG. 1A, in which a single surface acoustic wave absorber 5 is arranged to completely separate the interaction area into two, the respective surface acoustic wave absorbers 15 and 16 are arranged at different positions that respectively correspond to the two comb electrodes 13 and 14. Therefore, the interaction area is not completely separated into two. As a result, the interaction length of each interaction area can sufficiently be secured, thereby eliminating the need for applying high-frequency electric signals having high power to the comb electrodes 13 and 14, and also preventing a side lobe characteristic from being deteriorated.

Figure 3:
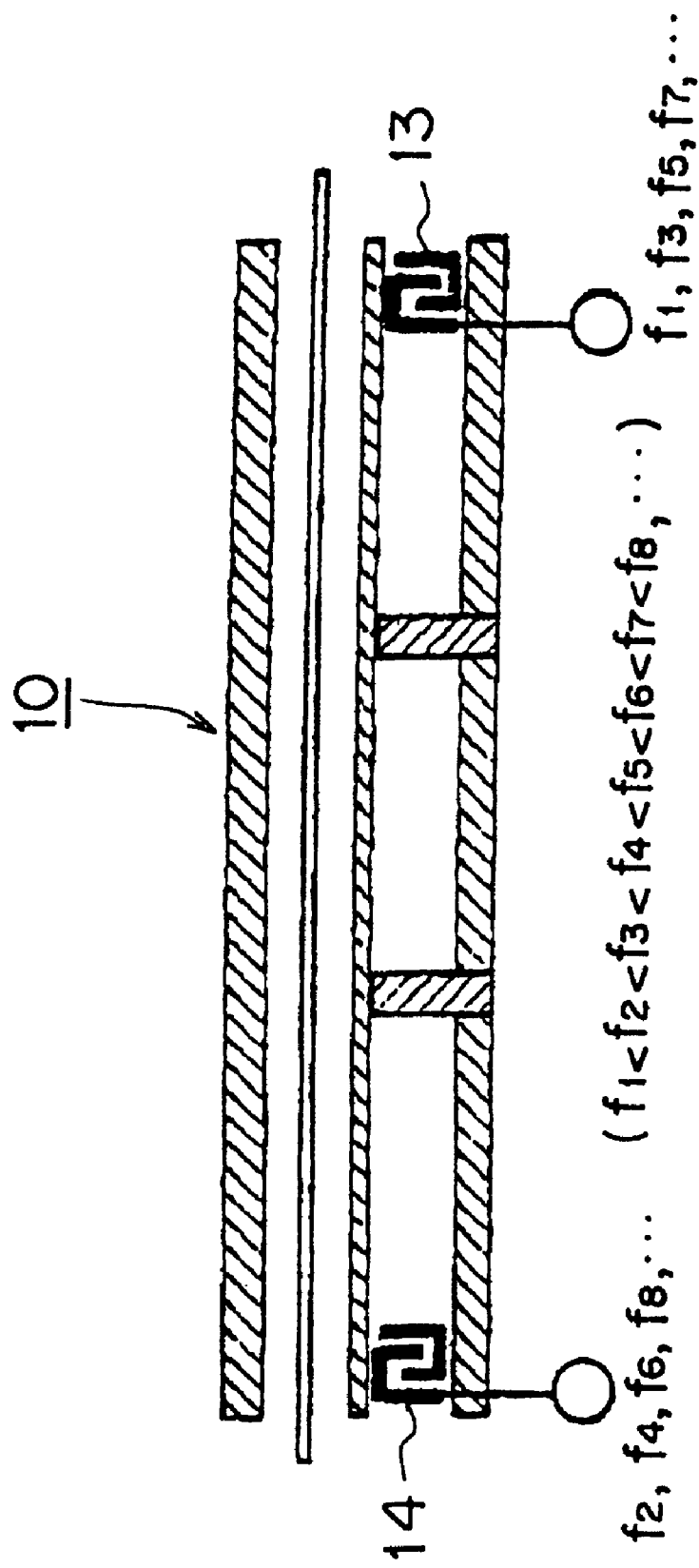
FIG. 3 conceptually exemplifies the method applying high-frequency electric signals to comb electrodes of the TE/TM mode converter shown in FIG. 2A.

The method with which high-frequency electric signals having adjacent frequencies are applied to respective comb electrodes 13 and 14 is conceptually exemplified in FIG. 3. This example is intended to assign frequencies that are the most adjacent to each other (for example, $f_1$ and $f_2$, $f_3$ and $f_4$; ...) among the frequencies $f_1, f_2, f_3, f_4, \ldots$ ($f_1<f_2<f_3<f_4<\ldots$) to be applied to the comb electrodes 13 and 14. In this way, the frequency interval of high-frequency electric signals applied to the same comb electrode can be widened, thereby obtaining a satisfactory wavelength selection characteristic.

Figure 4:
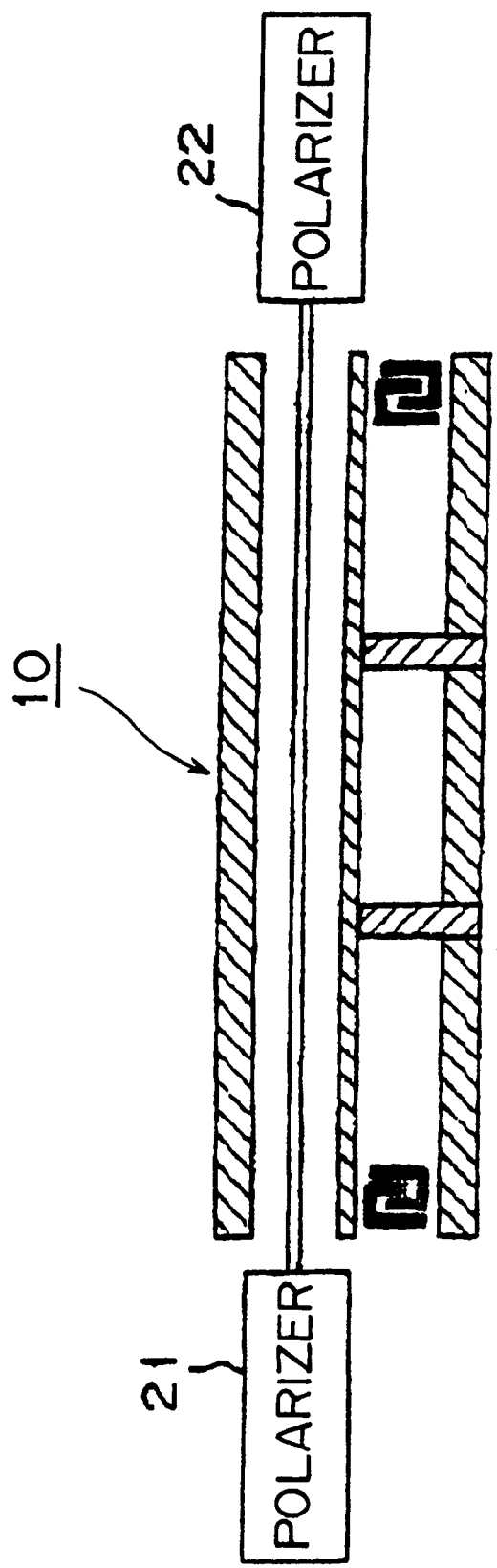
FIG. 4 shows the top view of a variable-wavelength optical filter according to one preferred embodiment of the present invention.

Next, the variable-wavelength optical filter shown in FIG. 4 will be explained.

This variable-wavelength optical filter is configured by the TE/TM mode converter 10 shown in FIG. 2A, and first and second polarizers 21 and 22, which are respectively arranged at an input portion and an output portion of the converter. For example, polarization beam splitters, etc. can be adopted as the polarizers 21 and 22. Here, if the first and second polarizers 21 and 22 are arranged to make their axes parallel, a bandstop filter, which does not pass only light having a particular wavelength, is configured. Or, if the first and second polarizers 21 and 22 are arranged to make their axes orthogonal, a bandpass filter, which passes only light having a particular wavelength, is configured.

Since the variable-wavelength filter having such a configuration adopts the above described TE/TM mode converter 10, lights having multiple adjacent wavelengths can selectively be filtered at the same time while preventing the power of high-frequency electric signals from increasing.

Figure 5:
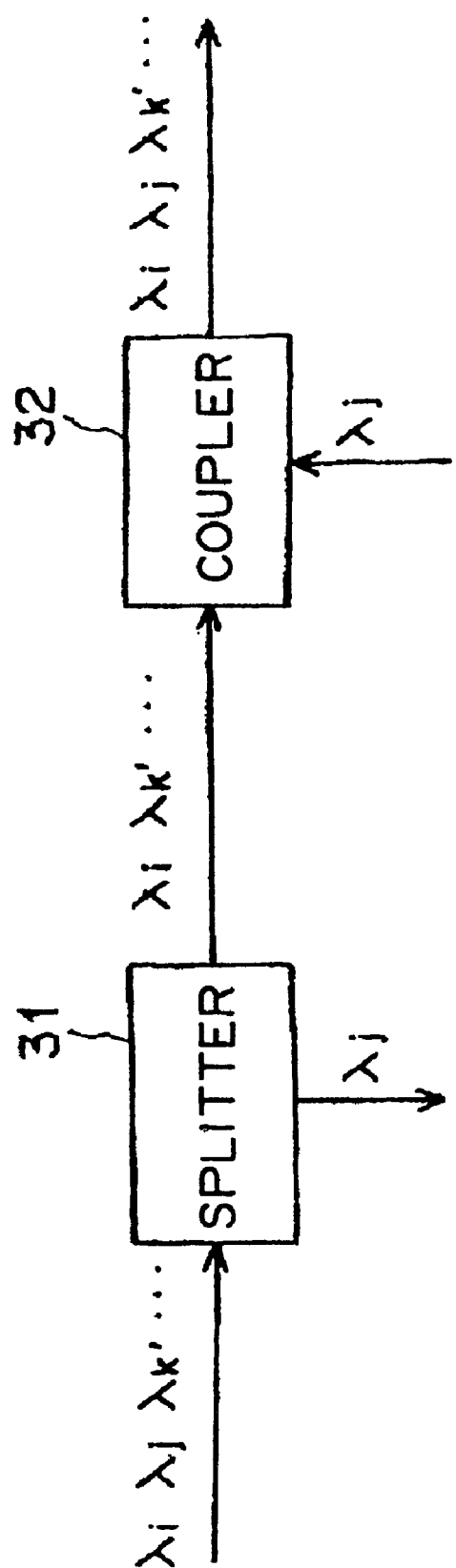
FIG. 5 exemplifies the configuration of a coupler/splitter, to which the variable-wavelength optical filter according to the present invention is applicable, in a WDM optical communications system.

Such a variable-wavelength optical filter is available, for example, as a splitter 31 which splits an optical signal having arbitrary wavelengths, a coupler 32 which couples optical signals having arbitrary wavelengths, etc. in a WDM optical communications system as shown in FIG. 5.

Up to this point, the preferred embodiments according to the present invention have been described. The present invention, however, is not limited to these preferred embodiments. The configuration of the present invention can be changed within the scope where the gist of the present invention is not deviated.

For example, the Ti-diffused area 17b is arranged over the entire length of the coupled acoustic waveguide 12 as a gap between acoustic waveguides in FIG. 2A. However, it is sufficient that such a gap is arranged at least only in a partial area depending on need.

Additionally, as stated earlier, if respective surface acoustic waves that are generated by a plurality of comb electrodes and propagate in a piezoelectric substrate are configured to, for example, have intensity distributions where peak positions are different as shown in FIG. 2B in interaction areas, it is not always necessary to arrange an optical waveguide, acoustic waveguides, comb electrodes, surface acoustic wave absorbers, etc. as shown in FIG. 2A.

As described above, with the TE/TM mode converter according to the present invention, multiple adjacent wavelengths can be selectively mode-converted at the same time while preventing the power of high-frequency electric signals to be applied to comb electrodes from increasing.

Furthermore, with the variable-wavelength optical filter according to the present invention, multiple adjacent wavelengths can selectively be filtered at the same time while preventing the power of high-frequency electric signals from increasing, thereby obtaining an excellent filter characteristic.

If high-frequency electric signals having adjacent frequencies are respectively assigned to different comb electrodes, the frequency interval of high-frequency electric signals to be applied to the same comb electrode can be widened, thereby realizing a more satisfactory wavelength selection characteristic.

What is claimed is:

1. An acousto-optic variable-wavelength TE/TM mode converter, comprising:

an optical waveguide arranged in a piezoelectric substrate;

first and second comb electrodes generating surface acoustic waves in the piezoelectric substrate;

a coupled acoustic waveguide, which is composed of first and second acoustic waveguides where at least partial areas in propagation directions of the surface acoustic waves are separated by a gap between the acoustic waveguides, for guiding the surface acoustic waves propagating in the piezoelectric substrate; and first and second surface acoustic wave absorbers absorbing the surface acoustic waves, wherein said first and second comb electrodes are arranged within the first acoustic waveguide, and said optical waveguide is arranged within the second acoustic waveguide, and said first and second surface acoustic wave absorbers are respectively arranged at positions which are interposed between said first and second comb electrodes, and are different in correspondence with said first and second comb electrodes respectively.

2. The acousto-optic variable-wavelength TE/TM mode converter according to claim 1, wherein:

said first comb electrode, said second surface acoustic wave absorber, said first surface acoustic wave absorber, and said second comb electrode are arranged in this order within the first acoustic waveguide;

a first surface acoustic wave generated by said first comb electrode is absorbed by said first surface acoustic wave absorber, and a second surface acoustic wave generated by said second comb electrode is absorbed by said second surface acoustic wave absorber; and the first and second surface acoustic waves respectively have intensity distributions where an intensity is high in a middle portion of said optical waveguide and low at both of ends of said optical waveguide, and peak positions of the intensity distributions are different.

3. The acousto-optic variable-wavelength TE/TM mode converter according to claim 2, wherein a distance between said first comb electrode and said first surface acoustic wave absorber and a distance between said second comb electrode and said second surface acorstic wave absorber are equal to a coupled length of said coupled acoustic waveguide.

4. The acousto-optic variable-wavelength TE/TM mode converter according to claim 3, wherein a distance between said first and second comb electrodes is longer than the coupled length, and shorter than a double of the coupled length.

5. The acousto-optic variable-wavelength TE/TM mode converter according to claim 4, wherein a distance between said first and second surface acoustic wave absorbers is ½ of the coupled length, and the distance between said first and second comb electrodes is 3/2 of the coupled length.

6. The acousto-optic variable-wavelength TE/TM mode converter according to claim 1, wherein high-frequency electric signals having adjacent frequencies are respectively assigned and applied to said first and second comb electrodes.

7. A variable-wavelength optical filter having an acousto-optic variable-wavelength TE/TM mode converter, and first and second polarizers respectively arranged at an input portion and an output portion of the acousto-optic variable-wavelength TE/TM mode converter, the acousto-optic variable-wavelength TE/TM mode converter comprising:

an optical waveguide arranged in a piezoelectric substrate;

first and second comb electrodes generating surface acoustic waves in the piezoelectric substrate;

a coupled acoustic waveguide, which is composed of first and second acoustic waveguides where at least partial areas in propagation directions of the surface acoustic waves are separated by a gap between the acoustic waveguides, for guiding the surface acoustic waves propagating in the piezoelectric substrate; and first and second surface acoustic wave absorbers absorbing the surface acoustic waves, wherein said first and second comb electrodes are arranged within the first acoustic waveguide, and said optical waveguide is arranged within the second acoustic waveguide, and said first and second surface acoustic wave absorbers are respectively arranged at positions which are interposed between said first and second comb electrodes, and are different in correspondence with said first and second comb electrodes respectively.

8. The variable-wavelength optical filter according to claim 7, wherein:

said first comb electrode, said second surface acoustic wave absorber, said first surface acoustic wave absorber, and said second comb electrode are arranged in this order within the first acoustic waveguide;

a first surface acoustic wave generated by said first comb electrode is absorbed by said first surface acoustic wave absorber, and a second surface acoustic wave generated by said second comb electrode is absorbed by said second surface acoustic wave absorber; and the first and second surface acoustic waves respectively have intensity distributions where an intensity is high in a middle portion of said optical waveguide and low at both of ends of said optical waveguide, and peak positions of the intensity distributions are different.

9. The variable-wavelength optical filter according to claim 8, wherein a distance between said first comb electrode and said first surface acoustic wave absorber and a distance between said second comb electrode and said second surface acoustic wave absorber are equal to a coupled length of said coupled acoustic waveguide.

10. The variable-wavelength optical filter according to claim 9, wherein a distance between said first and second comb electrodes is longer than the coupled length, and shorter than a double of the coupled length.

11. The variable-wavelength optical filter according to claim 10, wherein a distance between said first and second surface acoustic wave absorbers is ½ of the coupled length, and the distance between said first and second comb electrodes is 3⁄2 of the coupled length.

12. The variable-wavelength optical filter according to claim 7, wherein high-frequency electric signals having adjacent frequencies are respectively assigned and applied to said first and second comb electrodes.

13. The variable-wavelength optical filter according to claim 7, wherein a bandstop filter is configured by arranging the first and second polarizers to make their axes parallel.

14. The variable-wavelength optical filter according to claim 7, wherein a bandpass filter is configured by arranging the first and second polarizers to make their axes orthogonal.

15. A splitter using a variable-wavelength optical filter, the variable-wavelength optical filter comprising an acousto-optic variable-wavelength TE/TM mode converter, and first and second polarizers respectively arranged at an input portion and an output portion of said acousto-optic variable-wavelength TE/TM mode converter, said acousto-optic variable-wavelength TE/TM mode converter comprising:

an optical waveguide arranged in a piezoelectric substrate;

first and second comb electrodes generating surface acoustic waves in the piezoelectric substrate;

a coupled acoustic waveguide, which is composed of first and second acoustic waveguides where at least partial areas in propagation directions of the surface acoustic waves are separated by a gap between the acoustic waveguides, for guiding the surface acoustic waves propagating in the piezoelectric substrate; and first and second surface acoustic wave absorbers absorbing the surface acoustic waves, wherein said first and second comb electrodes are arranged within the first acoustic waveguide, and said optical waveguide is arranged within the second acoustic waveguide, and said first and second surface acoustic wave absorbers are respectively arranged at positions which are interposed between said first and second comb electrodes, and are different in correspondence with said first and second comb electrodes respectively.

16. A coupler using a variable-wavelength optical filter, the variable-wavelength optical filter comprising an acousto-optic variable-wavelength TE/TM mode converter, and first and second polarizers respectively arranged at an input portion and an output portion of said acousto-optic variable-wavelength TE/TM mode converter, said acousto-optic variable-wavelength TE/TM mode converter comprising:

an optical waveguide arranged in a piezoelectric substrate;

first and second comb electrodes generating surface acoustic waves in the piezoelectric substrate;

a coupled acoustic waveguide, which is composed of first and second acoustic waveguides where at least partial areas in propagation directions of the surface acoustic waves are separated by a gap between the acoustic waveguides, for guiding the surface acoustic waves propagating in the piezoelectric substrate; and first and second surface acoustic wave absorbers absorbing the surface acoustic waves, wherein said first and second comb electrodes are arranged within the first acoustic waveguide, and said optical waveguide is arranged within the second acoustic waveguide, and said first and second surface acoustic wave absorbers are respectively arranged at positions which are interposed between said first and second comb electrodes, and are different in correspondence with said first and second comb electrodes respectively.

17. An acousto-optic variable-wavelength TE/TM mode converter, which comprises in a piezoelectric substrate an optical waveguide propagating lights and a plurality of comb electrodes generating surface acoustic waves, and TE/TM-mode-converts only lights having wavelengths corresponding to frequencies of high-frequency electric signals applied to the comb electrodes among lights input to the optical waveguide by using an acousto-optic interaction between the surface acoustic waves which are respectively generated by the plurality of comb electrodes and propagate in the piezoelectric substrate, and light propagating through the optical waveguide, wherein:

the respective surface acoustic waves which are generated by the plurality of comb electrodes and propagate have intensity distributions where an intensity is high in a middle portion of the optical waveguide, and low at both ends of the optical waveguide; and peak positions of the intensity distributions are different, and the intensity distributions partially overlap in an area where intensities are low.

18. A variable-wavelength optical filter having an acousto-optic variable-wavelength TE/TM mode converter, and first and second polarizers respectively arranged at an input portion and an output portion of the acousto-optic variable-wavelength TE/TM mode converter, the acousto-optic variable-wavelength TE/TM mode converter comprising an optical waveguide propagating lights and a plurality of comb electrodes generating surface acoustic waves, and TE/TM-mode-converting only lights having wavelengths corresponding to frequencies of high-frequency electric signals applied to the comb electrodes among lights input to the optical waveguide by using an acousto-optic interaction between the surface acoustic waves generated by the comb electrodes and propagating in the piezoelectric substrate, and light propagating through the optical waveguide, wherein:

the respective surface acoustic waves which are generated by the plurality of comb electrodes and propagate have intensity distributions where an intensity is high in a middle portion of the optical waveguide, and low at both ends of the optical waveguide; and peak positions of the intensity distributions are different, and the intensity distributions partially overlap in an area where intensities are low.

* * * * *

UNITED STATES PATENT AND TRADEMARK OFFICE
CERTIFICATE OF CORRECTION

PATENT NO.   : 6,466,705 B2
DATED        : October 15, 2002
INVENTOR(S)  : Takehito Tanaka et al.

It is certified that error appears in the above-identified patent and that said Letters Patent is hereby corrected as shown below:

<u>Column 8,</u>
Line 40, delete "acorstic", insert -- acoustic --

Signed and Sealed this

Eighteenth Day of March, 2003

JAMES E. ROGAN
*Director of the United States Patent and Trademark Office*